US009811101B2

(12) United States Patent
Zhang et al.

(10) Patent No.: US 9,811,101 B2
(45) Date of Patent: Nov. 7, 2017

(54) POWER CONVERTER AND METHOD FOR REGULATING LINE TRANSIENT RESPONSE OF THE POWER CONVERTER

(71) Applicant: STMicroelectronics (Shenzhen) R&D Co. Ltd, Shenzhen (CN)

(72) Inventors: Hai Bo Zhang, Shenzhen (CN); Zi Yu Zeng, Whuan (CN); Jerry Huang, Shenzhen (CN)

(73) Assignee: STMicroelectronics (Shenzhen) R&D Co. Ltd, Shenzhen (CN)

( * ) Notice: Subject to any disclaimer, the term of this patent is extended or adjusted under 35 U.S.C. 154(b) by 154 days.

(21) Appl. No.: 14/663,165

(22) Filed: Mar. 19, 2015

(65) Prior Publication Data

US 2015/0378378 A1    Dec. 31, 2015

(30) Foreign Application Priority Data

Jun. 27, 2014 (CN) .......................... 2014 1 0305904

(51) Int. Cl.
*H02M 3/156* (2006.01)
*H02M 3/158* (2006.01)
*G05F 1/56* (2006.01)
*H02M 1/42* (2007.01)
*H02M 1/00* (2006.01)

(52) U.S. Cl.
CPC .......... *G05F 1/56* (2013.01); *H02M 1/4225* (2013.01); *H02M 3/156* (2013.01); *H02M 3/158* (2013.01); *H02M 2001/0022* (2013.01)

(58) Field of Classification Search
CPC ..... H02M 3/156; H02M 3/158; H02M 1/4225
See application file for complete search history.

(56) References Cited

U.S. PATENT DOCUMENTS

2010/0231183 A1* 9/2010 Jan .................. H02M 3/156
323/282

FOREIGN PATENT DOCUMENTS

TW    201034360 A    9/2010

OTHER PUBLICATIONS

First Office Action and Search Report for co-pending CN Appl. No. 201410305904.5 dated Jul. 3, 2017 (9 pages).

* cited by examiner

*Primary Examiner* — Timothy J Dole
*Assistant Examiner* — Ishrat Jamali
(74) *Attorney, Agent, or Firm* — Gardere Wynne Sewell LLP

(57) ABSTRACT

A power converter includes an input and an output with an energy storage circuit and a power switching circuit coupled between the input and the output. A feedback circuit generates a feedback voltage which is differentially compared to a reference in an error amplifier circuit to generate an error amplification signal. A comparator circuit generates a control signal for controlling on/off of the power switching circuit based on a first comparison signal related to the error amplification signal and a second comparison signal related to a charging current of the energy storage circuit. A regulating circuit is coupled between an output of the error amplifier circuit and an input of the comparator circuit for receiving the first comparison signal, the regulating circuit is configured to couple a voltage compensation signal related to an input voltage received by the input to an output of the error amplifier, so as to reduce a variation amount of the error amplification signal when the input voltage varies.

20 Claims, 8 Drawing Sheets

POWER CONVERTER AND METHOD FOR REGULATING LINE TRANSIENT RESPONSE OF THE POWER CONVERTER

PRIORITY CLAIM

This application claims priority from Chinese Application for Patent No. 201410305904.5 filed Jun. 27, 2014, the disclosure of which is incorporated by reference.

TECHNICAL FIELD

Embodiments of the present invention relate to a power converter, and more specifically, to a constant-frequency current-mode-controlled power converter, and a method for regulating line transient response of the power converter.

BACKGROUND

With the constant development of the SMPS (Switched Mode Power Supply) technology, the SMPS has become very common in a portable device (such as a mobile phone, a notebook computer, a tablet computer, a laptop, etc.). For an AMOLED (Active Matrix/Organic Light Emitting Diode) panel power supply, not only large current capacity and accurate output voltage are required, low output voltage ripple is also an important parameter. In order to provide a comfortable lighting for human eyes, how to design a power supply with a stable output and a low ripple for AMOLED panel is a very important issue for the portable device.

To satisfy the above needs, a constant-frequency current-mode-controlled power converter is usually used to implement an SMPS with a stable output and a low voltage ripple. Compared with an SMPS of other structure (e.g., a voltage-mode-controlled converter, a constant-on variable-frequency converter, a constant-off variable-frequency converter), the constant operation frequency of the constant-frequency current-mode-controlled power converter makes it easier to reduce the frequency spectrum interference to other blocks in the system.

The constant-frequency current-mode-controlled power converter comprises a boost converter, a buck converter, and a buck-boost converter. For example, FIG. 1 shows a principle diagram of a constant-frequency current-mode-controlled boost converter according to the prior art. FIG. 2 shows a waveform associated with the constant-frequency current-mode-controlled boost converter. With reference to FIGS. 1 and 2, suppose the boost converter has reached a steady state and the clock and sawtooth wave generator 101 generates a clock pulse at a certain time, then the clock pulse sets the output Q (i.e., the drive signal) of a RS flip-flop 102 to high, and the driver circuit 103 receives the signal outputted by the RS flip-flop 102 and turns on an NMOS transistor Mn through an internal logic and signal Driver_N, such that two PMOS transistors Mp1 and Mp2 are cut off by signals Driver_P; at this point, the input voltage Vin charges the inductor L, thereby increasing the current IL in the inductor L; when the current IL of the inductor L reaches a value set by the output VC of the error amplifier 104, a PWM comparator 105 generates a pulse, such that the RS flip-flop 102 is toggled, and the NMOS transistor Mn is cut off, the two PMOS transistors Mp1 and Mp2 are turned on; then the inductor L starts discharging. When the boost converter is operated in a steady state, it repeats the above procedure. The operating principles of the buck converter and the buck-boost converter are similar to the boost converter, which will not be detailed here.

Line transient response is also an important parameter for describing the output characteristics of the power converter. For example, for a boost converter, it is crucial to improve the line transient response in the boost converter. In order to improve the line transient response, a method that can be immediately contemplated is increasing the bandwidth. With the increase of the bandwidth, the response time of the entire power converter will be reduced, such that the line transient response of the power converter is improved. However, due to existence of a right plane zero, its bandwidth is limited into a very small region, which cannot be increased unlimitedly. Therefore, this method cannot improve the line transient response well. Particularly when the power converter operates at a minimum input voltage and a maximum output voltage, the bandwidth is very small, so the line transient response will get worse.

FIG. 3 is a circuit diagram of a constant-frequency current-mode-controlled boost converter having a slope compensation according to the prior art. With reference to FIG. 3, if a compensation capacitor CC in FIG. 3 is decreased, the bandwidth of the boost converter will be increased, but it is hard for the boost converter to become steady when the boost converter is in a maximum duty cycle and heavy load condition. Although decrease of the loop gain of the boost converter can also increase the bandwidth, it will decrease the accuracy of the output voltage. Therefore, it is hard to balance among the bandwidth, loop gain, accuracy, and stability in the boost converter.

However, reducing the slope compensation might be an easier way to improve line transient response.

Refer to FIG. 3 again, in which a relationship between VSUM and VC is presented, as expressed by the following equation:

$$VSUM = VSENSE + VSLOPE = VC \qquad (1)$$

It may be seen from equation (1) that if the slope compensation VSLOPE is decreased, VSUM will be decreased.

FIG. 4 shows variations of the output VC of the error amplifier and the output VOUT of the boost converter when the input voltage VIN varies in the boost converter of FIG. 3. With reference to FIG. 4, when the input voltage VIN varies from VI to VI−ΔV, the boost converter will change from state 1 to state 2, and the duty cycle changes from $$D1 = \frac{VO - VI}{VO}$$

to $$D2 = \frac{VO - VI + \Delta V}{VO}.$$

FIG. 5 shows variation of VSUM with time for different slope compensations in the boost converter of FIG. 3. With reference to FIG. 5, the slope of VSUM1 is mc1, and the slope of VSUM2 is mc2. It is seen that VSUM1>VSUM2, VSLOPE1>VSLOPE2, mc1>mc2. When the duty cycle varies from D1 to D2, the following equations may be derived:

$$\Delta VSUM1 = \Delta VC1 = mc1*(D2-D1)*T \qquad (2)$$

$$\Delta VSUM2 = \Delta VC2 = mc2*(D2-D1)*T \qquad (3)$$

$$\Rightarrow \Delta VC1 > \Delta VC2 \qquad (4)$$

It is seen that from state 1 to state 2, the variation of the VC value is larger when the slope compensation is larger. Moreover, it is known that the larger the variation ΔVC of the output VC of the error amplifier is, the greater is the variation on the output voltage VOUT. Therefore, when a smaller slope compensation is used, the variation on the VOUT will become even smaller, which means that the line transient response will improve when a smaller slope compensation is used.

FIG. 6 shows the simulation results of line transient response at a 1× slope and a 3× slope compensation. With reference to FIG. 6, it is seen that the larger VSUM is, the greater the variation on the output voltage VOUT is, i.e., VSUM1>VSUM2, dV1>dV2.

However, the above method of improving line transient response through decreasing the slope compensation has many problems. FIG. 7 shows variation of inductor current of the boost converter of FIG. 3 for different slope compensations. With reference to FIG. 7, it is seen that the slope compensation cannot be decreased unlimitedly, because in order to prevent generation of subharmonic oscillation when the duty cycle exceeds 50%, the slope compensation has to satisfy the following relationship:

$$m_c > \frac{m_2}{2} \quad (5)$$

Due to the requirement on the minimum value of $m_c$, when the boost converter operates at a higher duty cycle, this method of decreasing slope compensation cannot achieve a good effect, for example, if the boost converter is at a minimum input voltage and a maximum output voltage, $m_2$ will be the largest, and thus the value of $m_c$ will also be the largest.

Besides, it is seen from the equation (1), VSUM=VSENSE+VSLOPE=VC, that if the slope compensation is decreased, the value of VC will be decreased. When the converter operates at a minimum duty cycle and a light load current, the VC value will become very small. Therefore, there is a risk that the boost converter is susceptible to noise interference.

With further reference to FIG. 7, it is seen that even the above method of improving linear transient response by decreasing slope compensation is used, when the boost converter changes from state 1 to state 2, the value of ΔVc is still very large. Therefore, the line transient response is not good yet.

SUMMARY

In view of the deficiencies existing in the prior art, there is a need in the art to provide a power converter having an improved line transient response and a method for improving the line transient response of a power converter.

According to an aspect, there is provided a power converter, comprising: an input and an output; an energy storage circuit and a power switching circuit coupled between the input and the output; a feedback circuit coupled between the output and a ground and configured to generate a feedback voltage; an error amplifier circuit configured to generate an error amplification signal based on the feedback voltage; a comparator circuit configured to generate a control signal for controlling on/off of the power switching circuit based on a first comparison signal related to the error amplification signal and a second comparison signal related to a charging current of the energy storage circuit; and a regulating circuit coupled between an output of the error amplifier circuit and an input of the comparator circuit for receiving the first comparison signal, the regulating circuit is configured to couple a voltage compensation signal related to an input voltage received by the input to an output of the error amplifier, so as to reduce a variation amount of the error amplification signal when the input voltage varies.

According an exemplary embodiment, wherein the regulating circuit comprises a first circuit branch, a second circuit branch, a third circuit branch, and a fourth circuit branch, wherein the first circuit branch is configured to generate a first current based on the input voltage; the second circuit branch is connected to the first circuit branch so as to couple the first current to the third circuit branch; the third circuit branch is connected to the second circuit branch so as to generate the voltage compensation signal based on the first current; and the fourth circuit branch is connected to the third branch so as to couple the voltage compensation signal to an output of the error amplifier, wherein the first comparison signal is provided by a node between the second circuit branch and the third circuit branch.

According to an exemplary embodiment, the first circuit branch comprises a first resistor, a second resistor, a third resistor and a voltage follower, wherein the first resistor and the second resistor are connected in series between the input and the ground; an input of the voltage follower is connected to a node between the first resistor and the second resistor; and the third resistor is coupled between an output of the voltage follower and the ground to generate the first current.

According to an exemplary embodiment, wherein the first circuit branch further comprises a first MOS transistor connected in series between the third resistor and the second branch, the gate of the first MOS transistor being connected to an output of the voltage follower.

According to an exemplary embodiment, wherein the second circuit branch comprises a first current mirror and a second current mirror, wherein one side of the first current mirror is connected to the first circuit branch to receive the first current, the other side of the first current mirror is connected to one side of the second current mirror, and the other side of the second current mirror is connected to the third circuit branch to couple the first current to the third circuit branch.

According to one exemplary embodiment, the third circuit branch comprises a fourth resistor.

According to an exemplary embodiment, the fourth circuit branch comprises a second MOS transistor connected in series between a power supply voltage and the third circuit branch, and the gate of the second MOS transistor is connected to an output of the error amplifier circuit.

According to an exemplary embodiment, the regulating circuit further comprises a fifth circuit branch for providing a second current, wherein the fifth circuit branch is connected in series between the third circuit branch and the ground to couple the second current to the third circuit branch.

According to an exemplary embodiment, the fifth circuit branch comprises a current source and a third current mirror, wherein the current source is connected to one side of the third current mirror, and wherein the other side of the third current mirror is connected to the third circuit branch.

According to an exemplary embodiment, the feedback circuit comprises a fifth resistor and a sixth resistor connected in series between the output and the ground, the feedback voltage being provided by a node between the fifth resistor and the sixth resistor.

According to an exemplary embodiment, the power switching circuit comprises a plurality of power switching transistor, and the power converter further comprises a driver circuit, wherein the driver circuit is configured to receive the control signal and provide a corresponding control voltage for each of the power switching transistors in the power switching circuit.

According to an exemplary embodiment, the power switching circuit comprises a first power switching transistor and a second power switching transistor, the energy storage circuit and the first power switching transistor are connected in series between the input and the output, and the second power switching transistor and a seventh resistor are connected in series between the ground and a node between the energy storage circuit and the first power switching transistor.

According to an exemplary embodiment, the first power switching transistor and the second power switching transistor are MOS transistors of different conductive types. According to an exemplary embodiment, there further comprises a slope compensation circuit for performing slope compensation on the second comparison signal.

According an exemplary embodiment, the energy storage circuit comprises an inductor.

According to an exemplary embodiment, there further comprises a sensing circuit for generating the second comparison signal based on the charging current of the energy storage circuit.

According to an exemplary embodiment, the error amplifier comprises an operational amplifier, an eighth resistor, and a capacitor, wherein an negative input terminal of the operational amplifier receives the feedback voltage, an positive input terminal of the operational amplifier receives a reference voltage, an output terminal of the operational amplifier outputs the error amplification signal, the eight resistor and the capacitor are connected in series between the output terminal of the operational amplifier and the ground.

According to an exemplary embodiment, the comparator circuit is a PWM comparator circuit.

According to another aspect, there is provided a method for regulating line transient response of a power converter, wherein the power converter comprises an input, an output, and an energy storage circuit and a power switching circuit coupled between the input and the output, the method comprising: generating a feedback voltage based on an output voltage from the output; generating an error amplification signal based on the feedback voltage; generating a control signal for controlling on/off of the power switching circuit based on a first comparison signal related to the error amplification signal and a second comparison signal related to a charging current of the energy storage circuit; and coupling a voltage compensation signal related to an input voltage received by the input to the error amplification signal, so as to reduce a variation amount of the error amplification signal when the input voltage varies.

BRIEF DESCRIPTION OF THE DRAWINGS

Hereinafter, the embodiments will be described through examples with only reference to the accompanying drawings, wherein corresponding reference numerals are provided for similar components, wherein in the accompanying drawings.

DETAILED DESCRIPTION

It should be understood that these embodiments are described only for enabling those skilled in the art to better understand and then further implement the present invention, not intended to limit the scope of the present invention in any manner.

Figure 1:
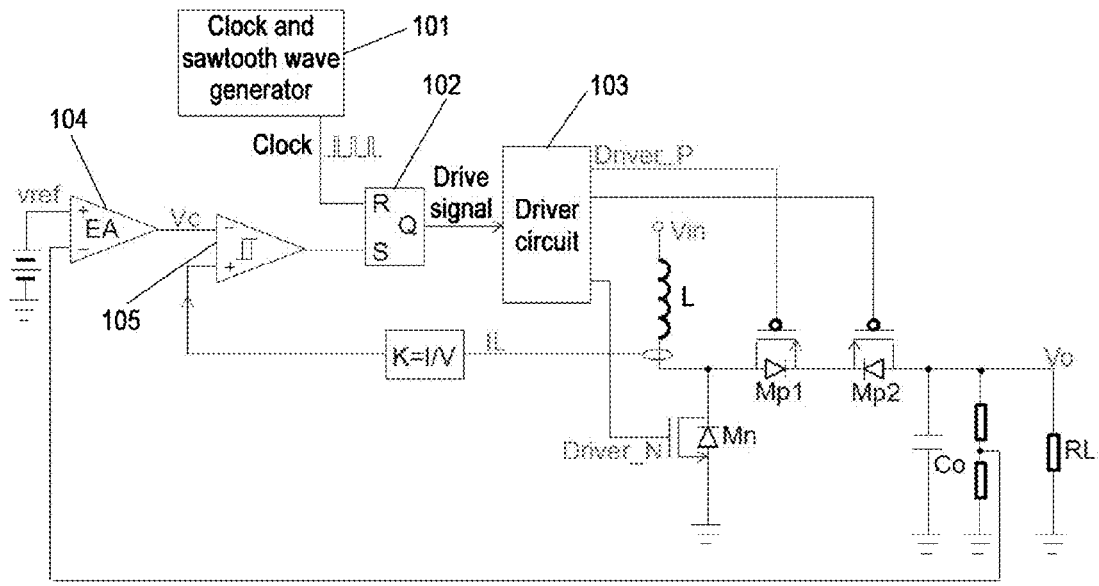
FIG. 1 shows a principle diagram of a constant-frequency current-mode-controlled boost converter according to the prior art.
Figure 2:
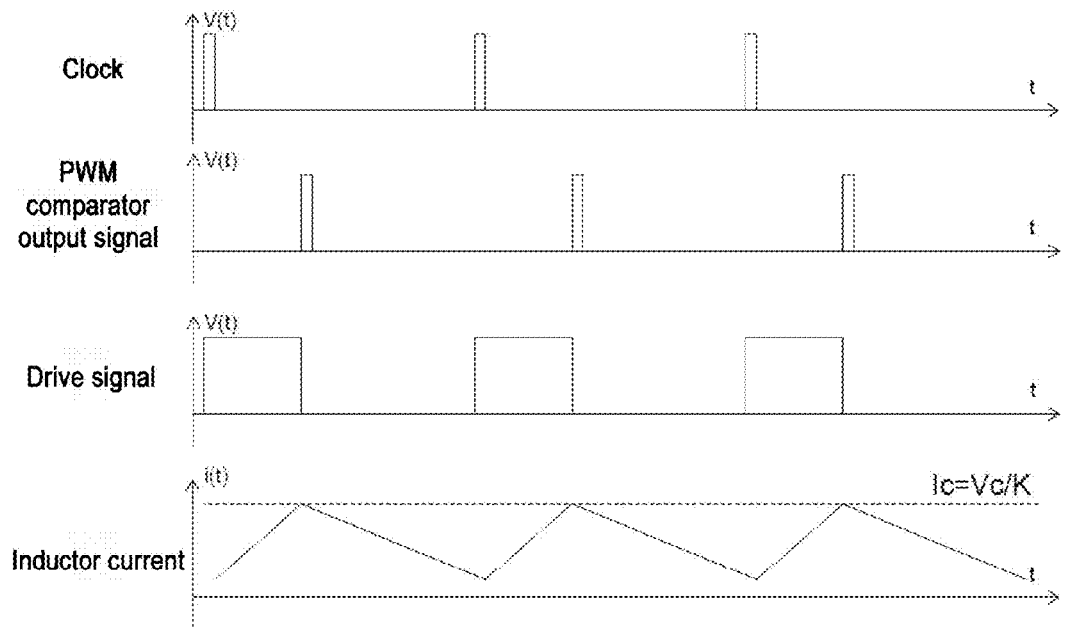
FIG. 2 shows a waveform associated with the boost converter as shown in FIG. 1.
Figure 3:
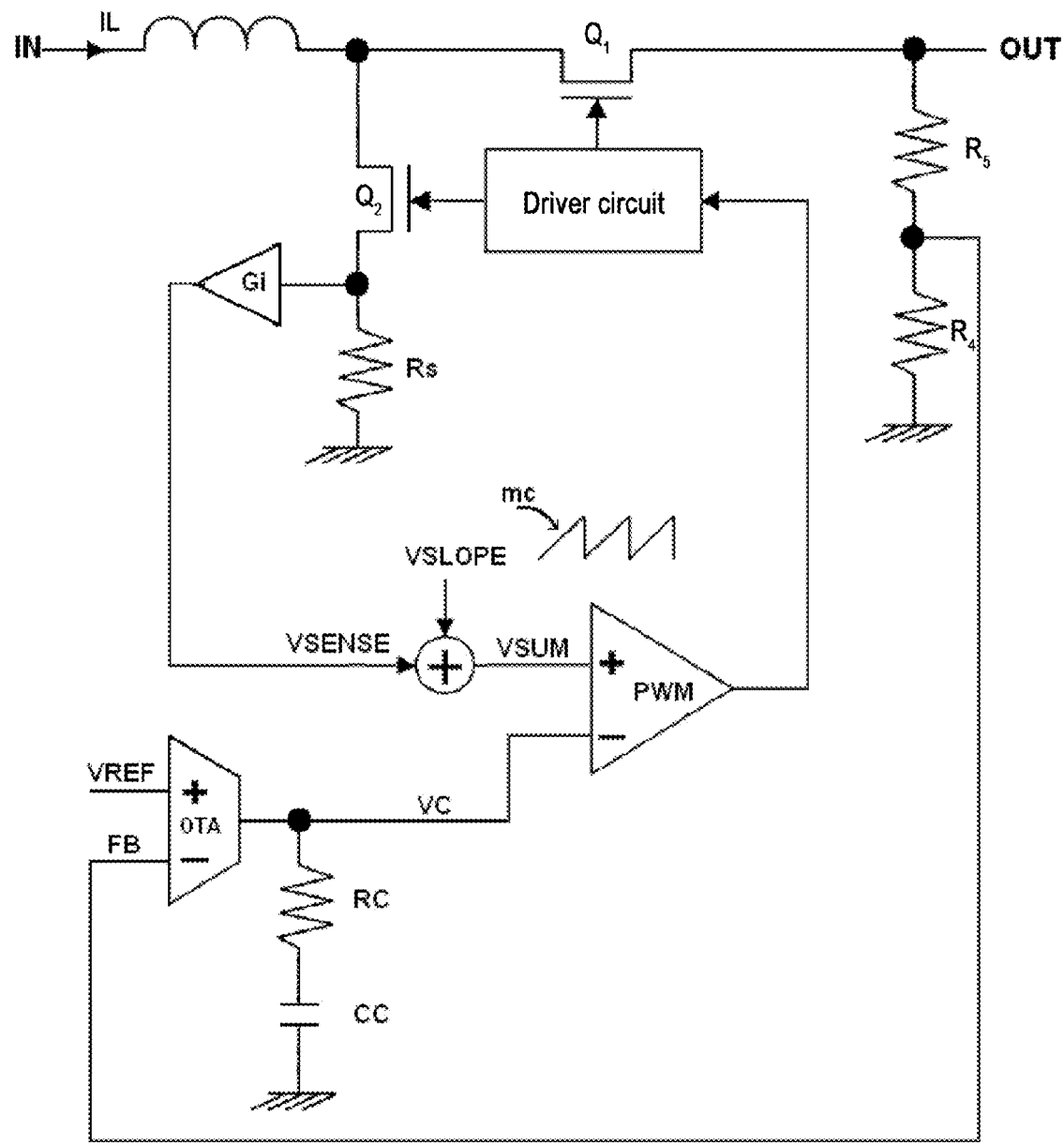
FIG. 3 shows a circuit diagram of a constant-frequency current-mode-controlled boost converter having a slope compensation according to the prior art.
Figure 4:
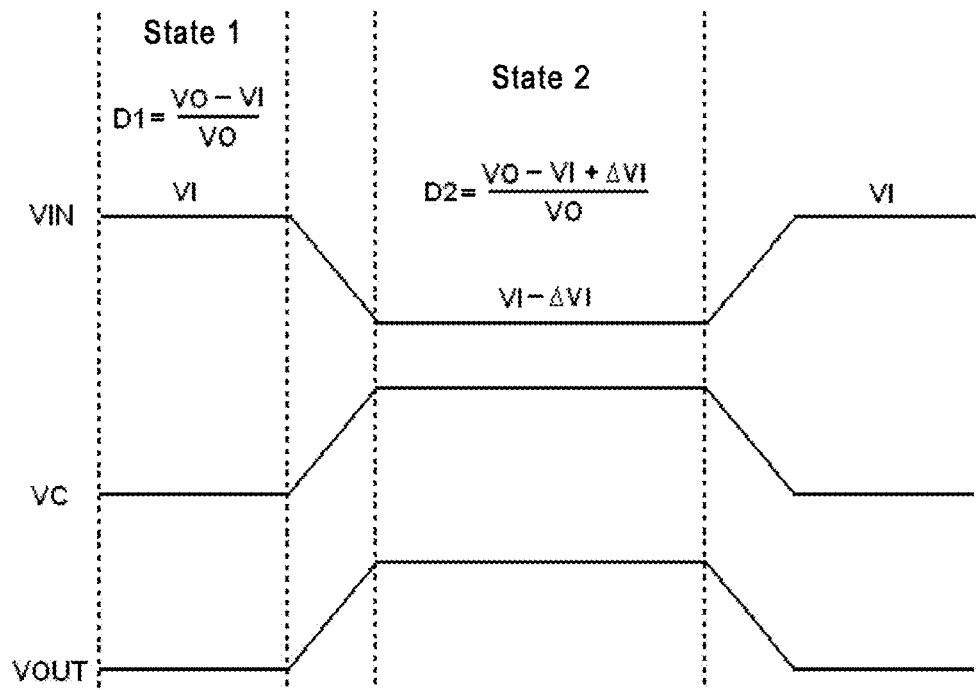
FIG. 4 shows variations of the output of the error amplifier and the output of the boost converter when the input voltage varies in the boost converter of FIG. 3.
Figure 5:
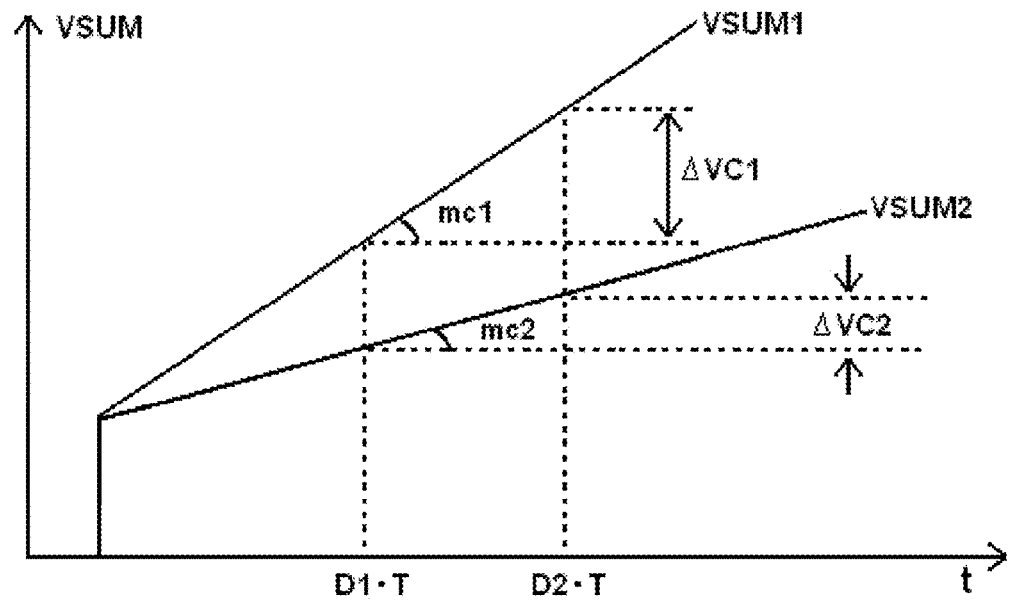
FIG. 5 shows variation of VSUM with time for different slope compensations in the boost converter of FIG. 3.
Figure 6:
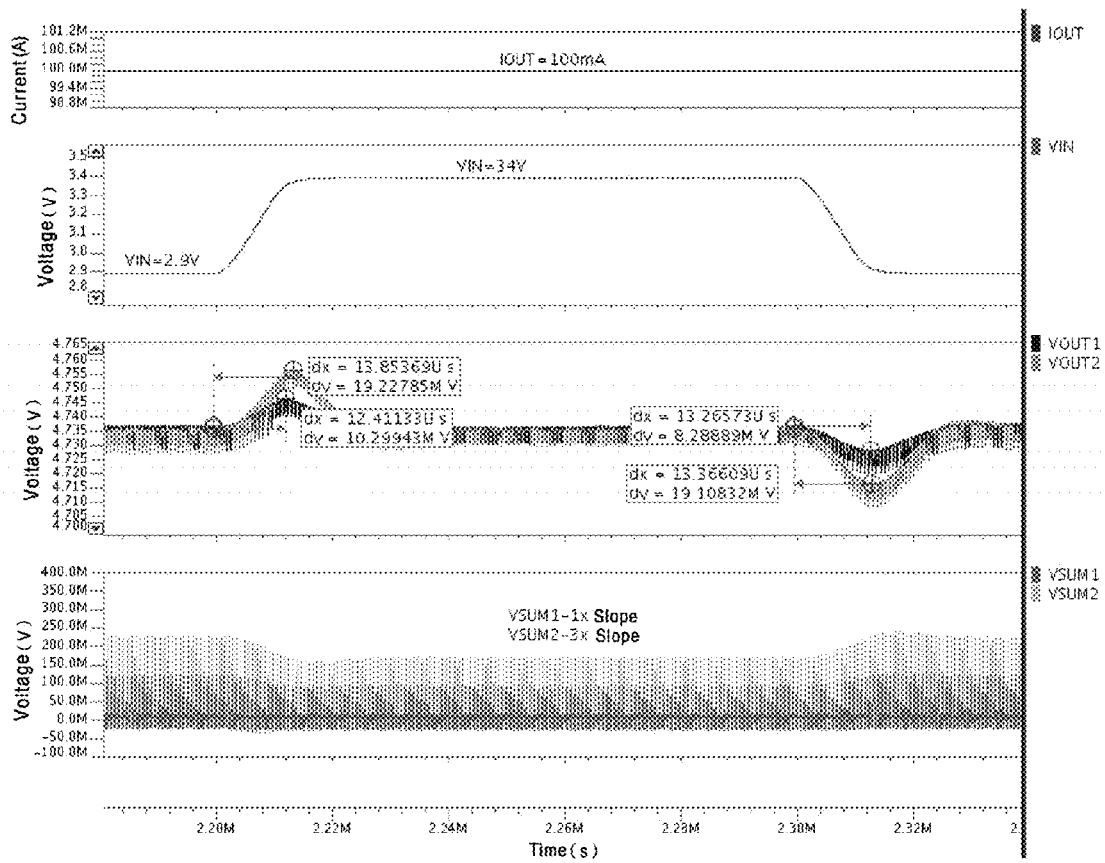
FIG. 6 shows simulation results of line transient response at a 1x slope and a 3x slope compensation for the boost converter as shown in FIG. 3.
Figure 7:
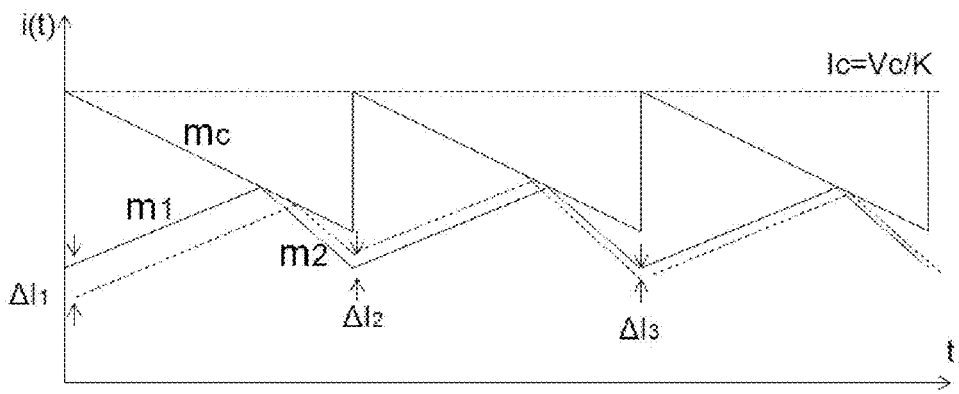
FIG. 7 shows variation of inductor current of the boost converter of FIG. 3 for different slope compensations.
Figure 8:
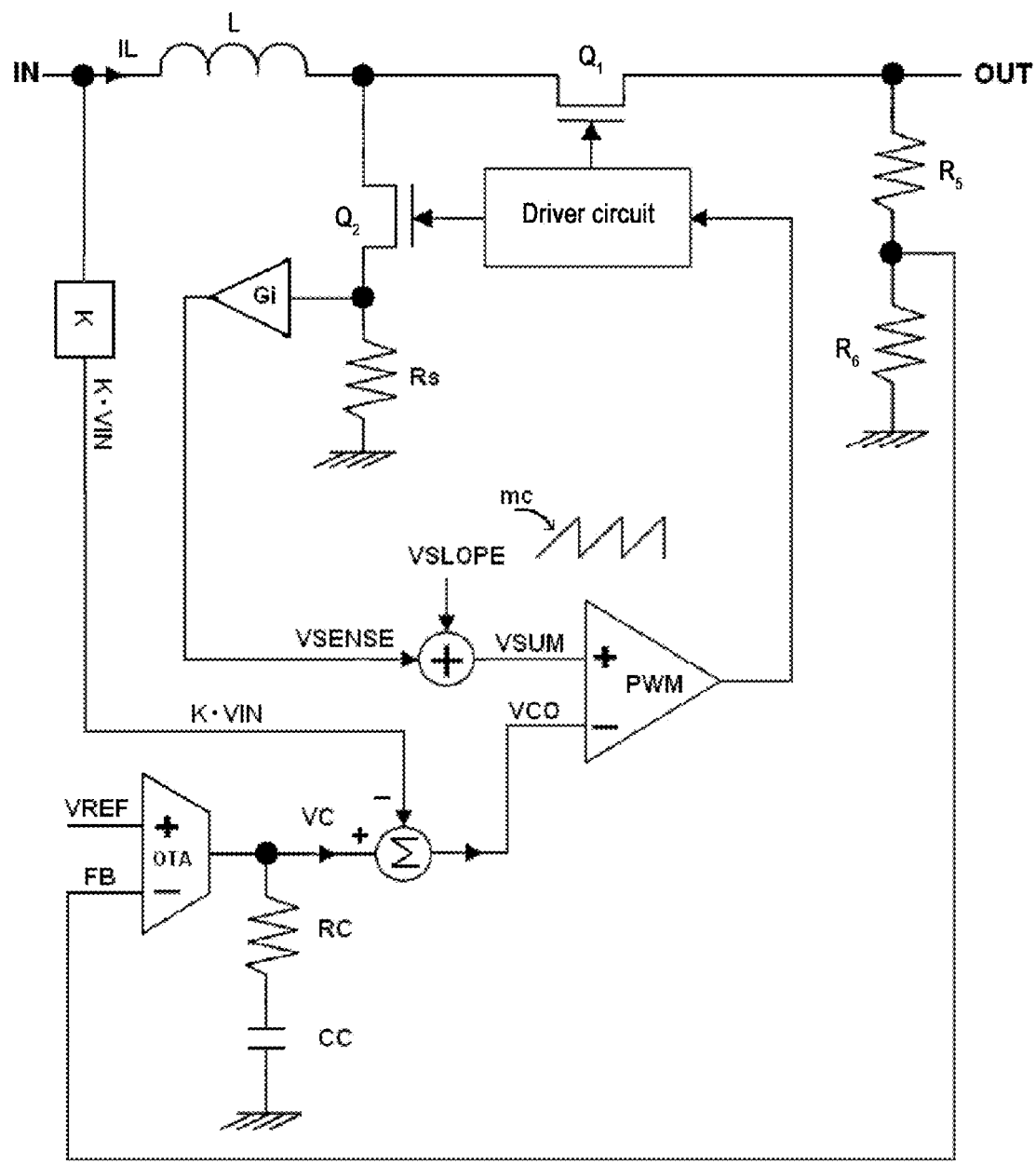
FIG. 8 shows a circuit diagram of a constant-frequency current-mode-controlled boost converter according to an embodiment.

FIG. 8 shows a circuit diagram of a constant-frequency current-mode-controlled boost converter.

As shown in FIG. 8, the boost converter comprises: an input IN and an output OUT, wherein the input IN is used for receiving an input voltage VIN, and the output OUT is used for outputting the converted voltage VOUT.

Further, the boost converter comprises: an energy storage circuit and a power switching circuit coupled between the input IN and the output OUT; and a feedback circuit coupled between the output OUT and the ground and configured to generate a feedback voltage FB.

Further, the boost converter comprises: an error amplifier circuit configured to generate an error amplification signal based on the feedback voltage FB; a comparator circuit configured to generate a control signal for controlling on/off of the power switching circuit based on a first comparison signal related to the error amplification signal and a second comparison signal related to a charging current of the energy storage circuit; and a regulating circuit coupled between an output of the error amplifier circuit and an input of the comparator circuit for receiving the first comparison signal, wherein the regulating circuit is configured to couple a voltage compensation signal related to an input voltage received by the input to an output of the error amplifier, so as to reduce a variation amount of the error amplification signal when the input voltage varies.

As shown in FIG. 8, in this embodiment, the energy storage circuit may comprise an inductor L; when the boost converter operates, the boost conversion procedure may be implemented through charging and discharging the inductor L so as to provide different output voltages. Those skilled in the art should understand, the inductor L may also be employed as an energy storage circuit in a buck converter and a buck-boost converter so as to perform the power conversion procedure.

In the embodiment, based on different needs, the power switching circuit may comprise a plurality of power switching transistors, and the boost converter further comprises a driver circuit configured to drive respective power switching transistors, wherein the driver circuit is configured to receive a control signal outputted by the comparator circuit and provide a corresponding control voltage for each power switching transistor in the power switching circuit, so as to control the on/off state of each power switching transistor. As shown in FIG. 8, in the boost converter, there are provided two power switching transistors (i.e., a first power switching transistor Q1 and a second power switching transistor Q2). The inductor L as the energy storage element and the first power switching transistor Q1 are connected in series between the input IN and the output OUT. The second power switching transistor Q2 and the seventh resistor Rs are connected in series between the ground and the node between the energy storage circuit and the first power switching transistor Q1. The first power switching transistor Q1 and the second power switching transistor Q2 may be MOS transistors of different conductivity types (such as PMOS transistor, NMOS transistor) or MOS transistors of the same conductivity type.

In the embodiments, respective MOS transistors may be driven respectively as required by adopting drive circuits with different configuration. The drive circuits may provide corresponding drive voltages for respective power switching transistors Q1, Q2 so as to turn on or turn off the corresponding power switching transistors. For example, when charging the inductor L, the drive circuit controls the first power switching transistor Q1 in off state and controls the second power switching transistor Q2 in on state. When discharging the inductor L, the drive circuit controls the first power switching transistor Q1 in on state and controls the second power switching transistor Q2 in off state.

As shown in FIG. 8, the feedback circuit may comprise a fifth resistor R5 and a sixth resistor R6 connected in series between the output OUT and the ground. The fifth resistor R5 and the sixth resistor R6 are used for dividing the output voltage VOUT. The feedback voltage FB is provided by a node between the fifth resistor R5 and the sixth resistor R6. The node between the fifth resistor R5 and the sixth resistor R6 is connected to a negative input of the error amplifier (OTA). Besides, resistance values of the fifth resistor R5 and the sixth resistor R6 may be varied as required so as to provide different feedback voltage FB.

As shown in FIG. 8, the boost converter further comprises a sensing circuit Gi for generating a second comparison signal based on a charging current of the inductor L. The sensing circuit Gi converts the sensed current into voltage and inputs it as the second comparison signal into the comparator circuit. Here, the second comparison signal may also be subject to slope compensation based on the slope compensation method to be described herein.

The boost converter may also comprise a slope compensation circuit for performing slope compensation on the second comparison signal to be input into the positive input of the comparator circuit. Through the slope compensation circuit, a part of a sawtooth wave voltage is added onto the second comparison voltage so as to improve the control characteristics, e.g., eliminating the harmonic oscillation. In the boost converter, when the duty cycle of the inductive current is greater than 50%, the original error is not decreased in the following periods while being increased. That is because the ratio between the current attenuation slope m2 and the current boost slope m1 is greater than 1. Therefore, when there is a disturbance entering, the caused oscillation cannot be automatically converged. A solution is to adjust the ratio between m2 and m1. Since the normal sample current is fixed, the objective of m2/m1<1 can only be achieved by an external compensation to change the slopes of m1 and 2. The method of slope compensation is known to those skilled in the art, which will not be detailed here.

As shown in FIG. 8, the error amplifier comprises an operational amplifier OTA, an eighth resistor RC, and a capacitor CC. The negative input terminal of the operational amplifier OTA receives the feedback voltage FB. The positive input terminal of the operational amplifier OTA receives a reference voltage. The output terminal of the operational amplifier OTA outputs an error amplification signal. The eighth resistor RC and the capacitor CC are connected in series between the output terminal of the operational amplifier OTA and the ground. Two inputs of the error amplifier receive the feedback voltage signal FB and the reference voltage signal VREF, respectively, and by subtracting the feedback voltage signal FB from the reference voltage signal and then multiplying with a gain of the error amplifier, the amplified error amplification signal is derived.

In the embodiment, through a regulating circuit, a variable K·VIN (i.e., voltage compensation signal) associated with the input voltage VIN will be derived. The resulted variable associated with VIN is added to the output of the error amplifier to regulate the output of the error amplifier. For example, in FIG. 8, $$VC = K \cdot VIN + VCO \tag{6}$$

It may be seen from the equation (6) that if the input voltage VIN increases, the output voltage VC of the error amplifier also increases, and if the input voltage VIN decreases, the output voltage VC of the error amplifier also decreases.

Figure 9:
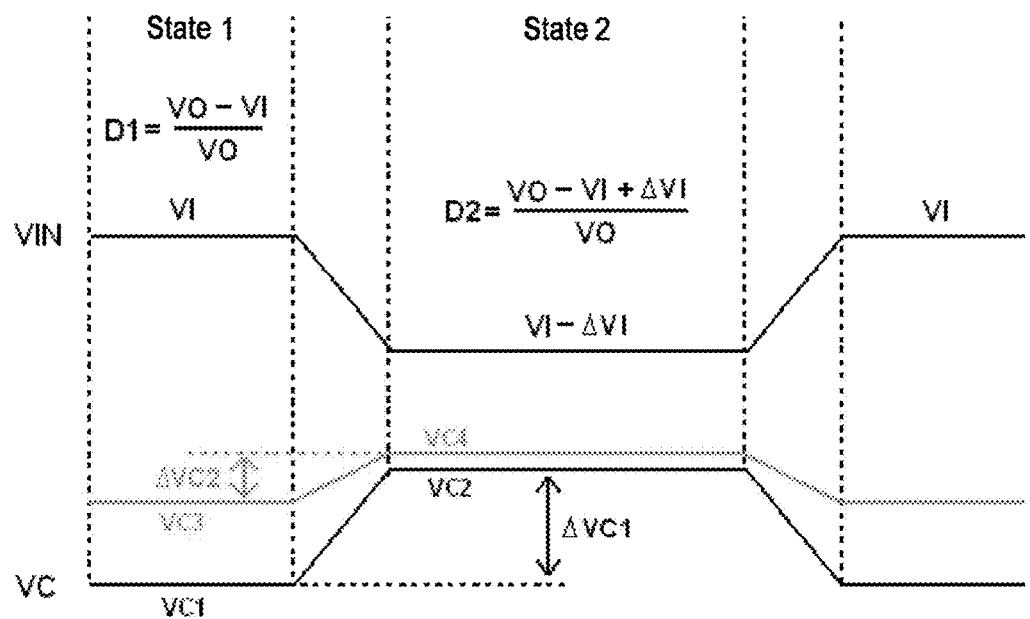
FIG. 9 shows a comparison between variation amounts of the output voltage of the error amplifiers when the input voltage varies in the boost converter as shown in FIGS. 8 and 3.

Hereinafter, the line transient response of the boost converter after introduction of the variable K·VIN associated with the input voltage VIN will be explained. As shown in FIG. 9, in the case that the variable K·VIN is not introduced, when the input voltage VIN varies from VI to VI−ΔV, the output voltage VC of the error amplifier varies from VC1 to VC2, and the VC variation amount is ΔVC1=VC2−VC1. However, in the boost converter of the present embodiment, due to introduction of the variable K·VIN, when the input voltage VIN varies from VI to VI−ΔV, the output voltage VC of the error amplifier varies from VC3 and VC4, the variation amount of VC is ΔVC=VC4−VC3.

It is seen through the above description that when the variable K·VIN associated with the input voltage VIN is not introduced, the variation amount ΔVC1 of the output voltage VC of the error amplifier may be expressed through the equation (7).

$$\Delta VC1 = mc * (D2 - D1) * T = mc * \frac{\Delta VI}{VO} * T \tag{7}$$

However, after the variable K·VIN associated with the input voltage VIN is introduced, the variation amount ΔVC2 of the output voltage VC of the error amplifier may be derived through equations (8) to (11).

$$VC=K \cdot VIN+VCO, VCO=VSUM \quad (8)$$

$$VC3=VSUM1+K \cdot VI=VCO1+K \cdot VI=VC1+K \cdot VI \quad (9)$$

$$VC4=VC2+K \cdot (VI-\Delta VI), \Delta VI>0 \quad (10)$$

$$\Delta VC2=VC4-VC3=VC2-VC1-K \cdot \Delta VI=\Delta VC1-K \cdot \Delta VI \quad (11)$$

By comparing equation (7) and equation (11), it is derived, $$\Delta VC2=\Delta VC1-K \cdot \Delta V/<\Delta VC1 \quad (12)$$

It may be seen from equation (12) that because a variable associated with the voltage VIN inputted from the input IN of the booster converter is introduced in the output voltage VC of the error amplifier, $\Delta VC2$ is always smaller than $\Delta VC1$, such that when the input voltage VIN varies from VI to VI−ΔV, the boost converter provided in this embodiment will be easier to reach the steady state than the boost converter without introduction of the variable associated with the input voltage VIN.

Now, suppose an extreme situation when the boost converter operates, i.e., after introducing the variable associated with the input voltage VI in the output of the error amplifier, when the input voltage VIN varies from VI to VI−ΔV, the output voltage of the error amplifier maintains substantially unchanged. In this case, by setting $$\Delta VC2=VC4-VC3=\Delta VC1-K \cdot \Delta V/=0,$$

it may be derived:

$$K = \frac{\Delta VC1}{\Delta VI} = \frac{mc*(D2-D1)*T}{\Delta VI} = \frac{mc*T}{VO} \quad (13)$$

Figure 10:
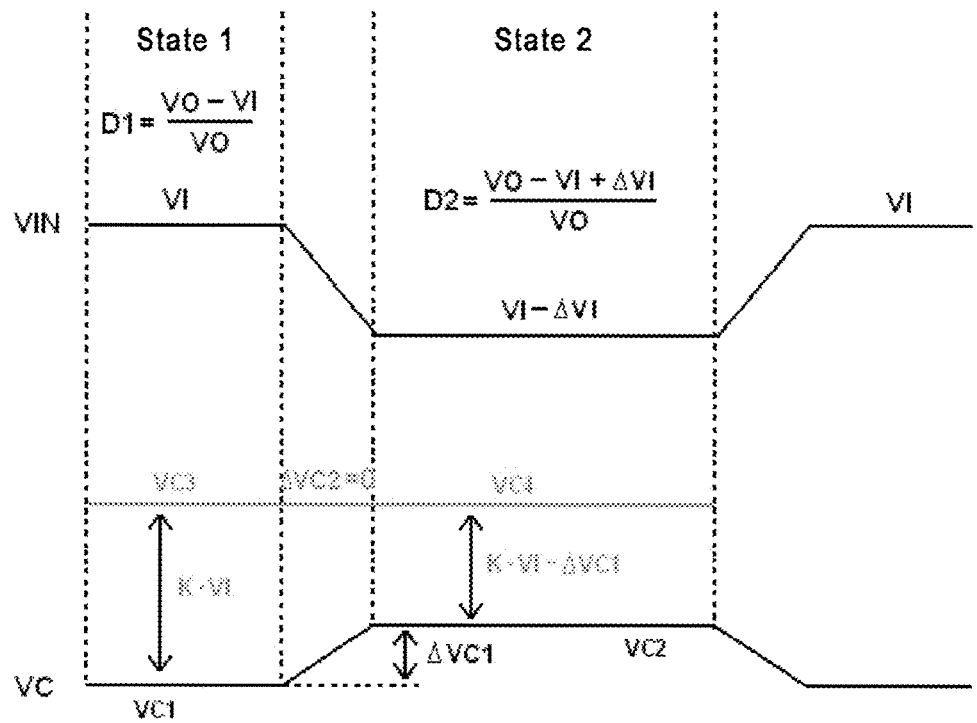
FIG. 10 is a schematic diagram illustrating that an output of an error amplifier is maintained unchanged when an input voltage varies in the boost converter shown in FIG. 8.

FIG. 10 describes the above supposed situation. As shown in FIG. 10, when the input voltage VIN varies from VI to VI−ΔV, the variation amount of the output voltage of the error amplifier is $\Delta VC2=VC4-VC3=0$.

Therefore, in order to reduce the variation amount of the output of the error amplifier when the input voltage VIN varies, a variable K·VIN associated with the input voltage VIN may be introduced into the output voltage of the error amplifier, the variation amount of the output voltage of the error amplifier is:

$$\Delta VC2=VC4-VC3=0.$$

Therefore, in order to reduce the variation amount of the output of the error amplifier when the input voltage VIN changes, a variable K·VIN associated with the input voltage VIN may be introduced into the output voltage of the error amplifier, wherein:

$$0 < K \leq \frac{mc*T}{VO} \quad (14)$$

Hereinafter, a specific embodiment of a regulating circuit will be described with reference to FIG. 11. However, those skilled in the art should understand that the regulating circuit is not limited to the above specific configuration. Any circuit capable of coupling the variable K·VIN associated with the input voltage VIN to the output of the error amplifier so as to reduce the variation amount of the error amplification signal when the input voltage changes falls into the scope of the present invention.

In this embodiment, the regulating circuit may comprise a first circuit branch, a second circuit branch, a third circuit branch, and a fourth circuit branch.

Figure 11:
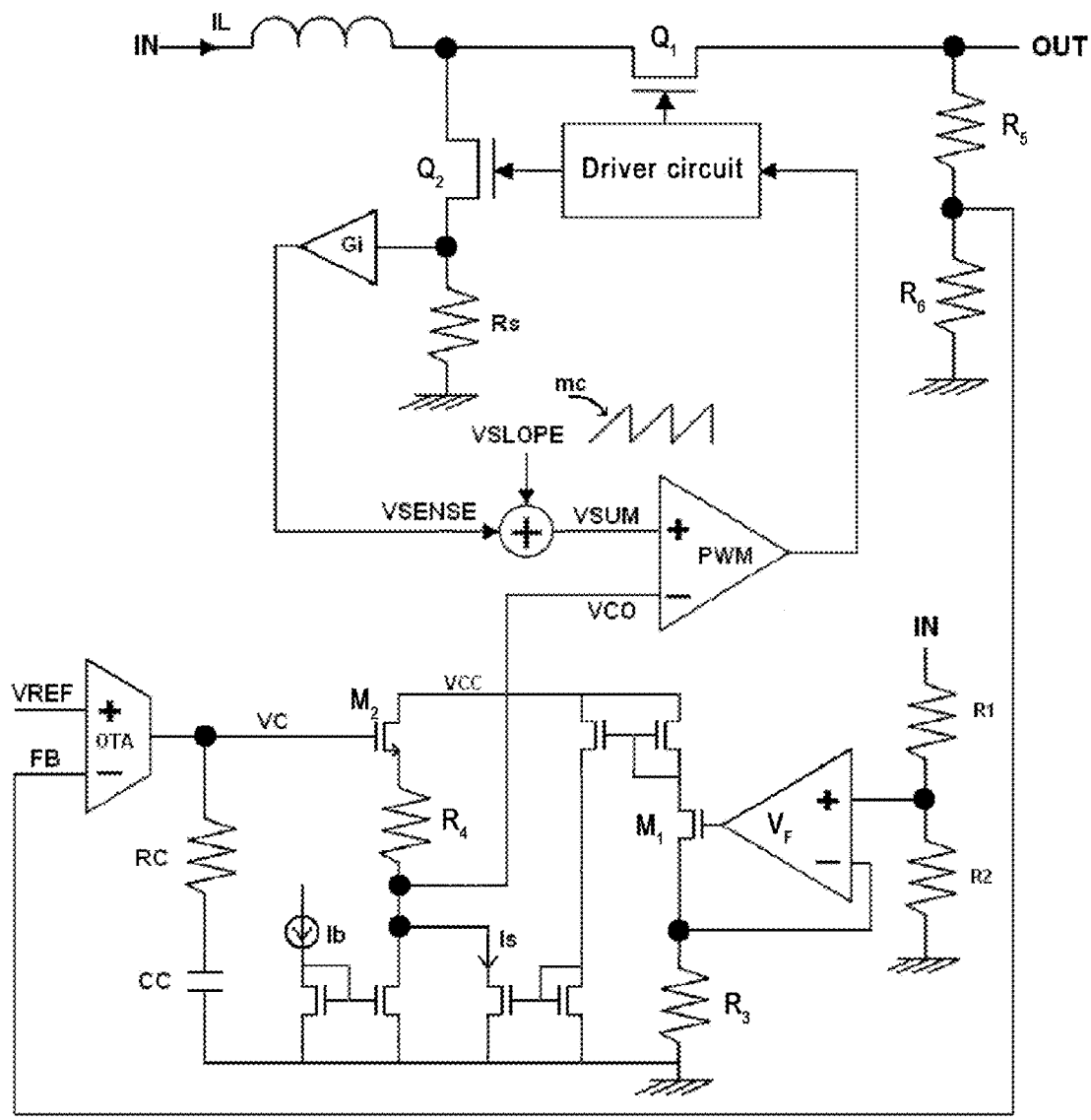
FIG. 11 is a schematic diagram of a regulating circuit illustrating a boost converter with specific configuration.

As shown in FIG. 11, the first circuit branch is configured to generate a first current based on an input voltage VIN. The first circuit branch may comprise a first resistor R1, a second resistor R2, a third resistor R3, and a voltage follower amplifier VF. The first resistor R1 and the second resistor R2 are connected in series between an input IN and a ground. An input of the voltage follower VF is connected to a node between the first resistor R1 and the second resistor R2. The third resistor R3 is coupled between an output of the voltage follower VF and the ground so as to generate the first current. Here, the first current as generated will be coupled to the third circuit branch via the second circuit branch, wherein the second circuit branch may be a current mirror circuit for current coupling, and the third circuit branch may be a circuit for converting current to voltage. The third circuit branch may also comprise a first MOS transistor connected in series between the third resistor R3 and the second circuit branch, and the gate of the first MOS transistor M1 is connected to an output of the voltage follower VF.

As shown in FIG. 11, the second circuit branch is connected to the first circuit branch for coupling the first current to the third circuit branch. In the present embodiment, the second circuit branch may comprise a first current mirror and a second current mirror, wherein one side of the first current mirror is connected to the first circuit branch to receive the first current, the other side of the first current mirror is connected to one side of the second current mirror, while the other side of the second current mirror is connected to the third circuit branch to couple the first current to the third circuit branch.

As shown in FIG. 11, in the present embodiment, the third circuit branch is connected to the second circuit branch to generate a voltage compensation signal based on the received first current, and the third circuit branch may comprise a fourth resistor R4. Regarding the generated voltage compensation signal, it will be described in detail herein.

As shown in FIG. 11, the fourth circuit branch is connected to the third circuit branch for coupling the voltage compensation signal to an output of the error amplifier; the fourth circuit branch may comprise a second MOS transistor M2 connected in series between the power supply voltage VCC and the third circuit branch, the gate of the second MOS transistor M2 is connected to an output of the error amplifier circuit, and a source and a drain of the second MOS transistor M2 are connected to the power supply voltage VCC and the fourth resistor R4, respectively.

As shown in FIG. 11, in the present embodiment, the first comparison signal inputted to the PWM comparator circuit may be provided by a node (i.e., the node between the fourth resistor R4 and the second current mirror) between the second circuit branch and the third circuit branch).

As shown in FIG. 11, in the present embodiment, the regulating circuit may further comprise a fifth circuit branch for providing a second current. The second current is used here as a bias current. The fifth circuit branch is corrected in series between the fourth resistor R4 and the ground so as to couple the second current to the fourth resistor R4; wherein the fifth circuit branch may comprise a current source Ib and a third current mirror; a current input of the current source Ib is inputted to one side of the third current mirror, the other side of the third current mirror is connected to the fourth resistor R4 to couple the second current to the fourth resistor R4.

Hereinafter, with reference to FIG. 11, the line transient response of the boost converter according to the present embodiment will be described.

As shown in FIG. 11, the input voltage VIN, after being divided through the first resistor R1 and the second resistor R2, is provided to an input terminal of the voltage follower VF; the voltage follower VF outputs the voltage and generates a first current in the third resistor R3, wherein the first current is expressed by the equation (15):

$$Is = VIN \times \frac{R2}{(R1 + R2) \times R3} \quad (15)$$

The first current is passed to the fourth resistor R4 through two interfaced current mirrors (i.e., the first current mirror and the second current mirror) to the fourth resistor R4, and the current Ib provided by the current source is coupled to the fourth resistor R4 through the third current mirror, so as to generate voltage across the fourth resistor R4. The voltage generated on the fourth resistor R4 is coupled to an output terminal of the error amplifier through the second MOS transistor M2, thereby raising the output voltage of the error amplifier, which may be expressed through equation (16):

$$VC=VCO+V_{GS}\pm(Ib+Is)\times R4 \quad (16)$$

By transforming the equation (16), equation (17) may be derived:

$$\Rightarrow VC=(VCO+V_{GS}+Ib\times R4)+K\cdot VIN \quad (17)$$

Wherein, $$K = \frac{R2 \times R4}{(R1 + R2) \times R3} \quad (18)$$

It is seen from equation (17) that when the input voltage VIN increases, the output voltage VC of the error amplifier also increases; when the input voltage VIN drops, the output voltage VC of the error amplifier also drops. For example, if the input voltage VIN varies from 3.4V to 2.9 V, then the output voltage VC of the error amplifier also varies from VCO1+K·3.4 to VCO2+K·2.9. Therefore, ΔVC=VCO2−VCO1−K·0.5=ΔVCO−K·0.5<Δ VCO.

Figure 12:
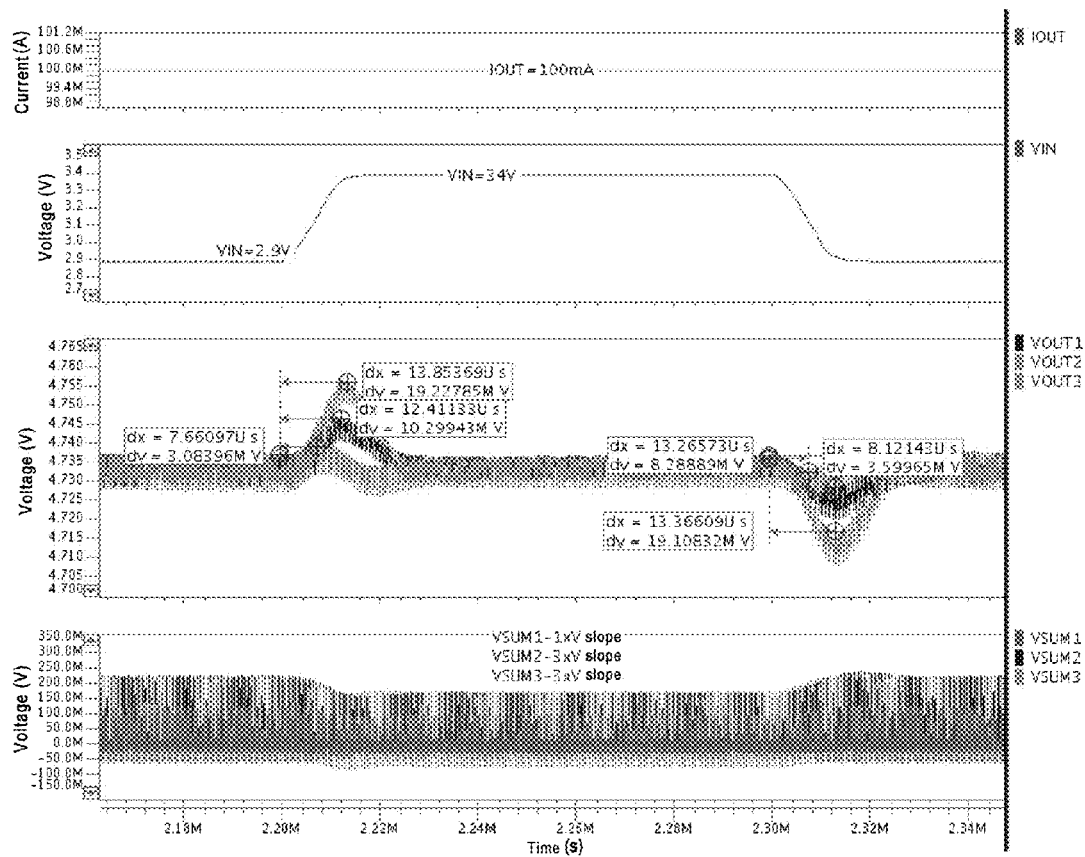
FIG. 12 shows a comparison between simulation results of the line transient response of the boost converters as shown in FIG. 11 and FIG. 3.

This means ΔVC becomes smaller than before. This change can also be seen from the simulation results corresponding to the line transient in the two scenarios shown in FIG. 12.

Although the above embodiments have illustrated the principle of the present invention in conjunction with a boost converter, those skilled in the art should understand that the present invention is likewise suitable for a buck converter and a buck-boost converter. The principle of the buck converter and the buck-boost converter will not be detailed here.

In another embodiment, there is further provided a method for regulating a line transient response of a power converter, wherein the power converter may employ the power converter depicted in the above examples. The method comprises: generating a feedback voltage based on an output voltage from the output; generating an error amplification signal based on the feedback voltage; generating a control signal for controlling on/off of the power switching circuit based on a first comparison signal related to the error amplification signal and a second comparison signal related to a charging current of the energy storage circuit; and coupling a voltage compensation signal related to an input voltage received by the input to an output of the error amplifier, so as to reduce a variation amount of the error amplification signal when the input voltage varies.

The description of the present invention has been provided for the purpose of illustration and depiction. However, it does not intend to exhaust or limit the invention as disclosed. Those skilled in the art may contemplate many modifications and alterations. Therefore, the embodiments are selected and depicted for better illustrating the principle, practical application of the present invention and enabling other people in those skilled in the art to appreciate that without departing from the spirit of the present invention, all modifications and replacements should fall within the protection scope of the present invention as limited in the appended claims.

The invention claimed is:

1. A power converter, comprising:
   an input;
   an output;
   an energy storage circuit;
   a power switching circuit coupled between the input and the output;
   a feedback circuit coupled between the output and a ground and configured to generate a feedback voltage;
   an error amplifier circuit configured to generate an error amplification signal based on the feedback voltage;
   a comparator circuit configured to generate a control signal for controlling turn on and turn off of the power switching circuit based on a first comparison signal related to the error amplification signal and a second comparison signal related to a charging current of the energy storage circuit; and
   a regulating circuit coupled between an output of the error amplifier circuit and an input of the comparator circuit for receiving the first comparison signal, wherein the regulating circuit is configured to couple a voltage compensation signal that is constantly proportional to a magnitude of an input voltage received by the input to an output of the error amplifier circuit, so as to reduce a variation amount of the error amplification signal when the input voltage varies.

2. The power converter according to claim 1, wherein the regulating circuit comprises a first circuit branch, a second circuit branch, a third circuit branch, and a fourth circuit branch, wherein:
   the first circuit branch is configured to generate a first current proportional to the magnitude of based on the input voltage;
   the second circuit branch is connected to the first circuit branch so as to couple the first current to the third circuit branch;
   the third circuit branch is connected to the second circuit branch so as to generate the voltage compensation signal based on the first current; and
   the fourth circuit branch is connected to the third circuit branch so as to couple the voltage compensation signal to an output of the error amplifier circuit,
   wherein the first comparison signal is provided by a node between the second circuit branch and the third circuit branch.

3. The power converter according to claim 2, wherein the first circuit branch comprises a first resistor, a second resistor, a third resistor and a voltage follower, wherein:
the first resistor and the second resistor are connected in series between the input and the ground;
an input of the voltage follower is connected to a node between the first resistor and the second resistor; and
the third resistor is coupled between an output of the voltage follower and the ground to generate the first current.

4. The power converter according to claim 3, wherein the first circuit branch further comprises a first MOS transistor connected in series between the third resistor and the second circuit branch, a gate of the first MOS transistor being connected to an output of the voltage follower.

5. The power converter according to claim 2, wherein the second circuit branch comprises a first current mirror and a second current mirror, wherein:
one side of the first current mirror is connected to the first circuit branch to receive the first current, an other side of the first current mirror is connected to one side of the second current mirror, and an other side of the second current mirror is connected to the third circuit branch to couple the first current to the third circuit branch.

6. The power converter according to claim 2, wherein the third circuit branch comprises a fourth resistor.

7. The power converter according to claim 2, wherein the fourth circuit branch comprises a second MOS transistor connected in series between a power supply voltage and the third circuit branch, and a gate of the second MOS transistor is connected to an output of the error amplifier circuit.

8. The power converter according to claim 2, wherein the regulating circuit further comprises a fifth circuit branch for providing a second current, wherein the fifth circuit branch is connected in series between the third circuit branch and the ground to couple the second current to the third circuit branch.

9. The power converter according to claim 8, wherein the fifth circuit branch comprises a current source and a third current mirror, wherein the current source is connected to one side of the third current mirror, and wherein an other side of the third current mirror is connected to the third circuit branch.

10. The power converter according to claim 1, wherein the feedback circuit comprises a fifth resistor and a sixth resistor connected in series between the output and the ground, the feedback voltage being provided by a node between the fifth resistor and the sixth resistor.

11. The power converter according to claim 1, wherein the power switching circuit comprises a plurality of power switching transistor, and the power converter further comprises a driver circuit, wherein the driver circuit is configured to receive the control signal and provide a corresponding control voltage for each of the power switching transistors in the power switching circuit.

12. The power converter according to claim 11, wherein the power switching circuit comprises a first power switching transistor and a second power switching transistor, the energy storage circuit and the first power switching transistor are connected in series between the input and the output, and the second power switching transistor and a seventh resistor are connected in series between the ground and a node between the energy storage circuit and the first power switching transistor.

13. The power converter according to claim 12, wherein the first power switching transistor and the second power switching transistor are MOS transistors of different conductive types.

14. The power converter according to claim 1, further comprising a slope compensation circuit for performing slope compensation on the second comparison signal.

15. The power converter according to claim 1, wherein the energy storage circuit comprises an inductor.

16. The power converter according to claim 1, further comprising a sensing circuit for generating the second comparison signal based on the charging current of the energy storage circuit.

17. The power converter according to claim 1, wherein the error amplifier circuit comprises an operational amplifier, an eighth resistor, and a capacitor, wherein an negative input terminal of the operational amplifier receives the feedback voltage, an positive input terminal of the operational amplifier receives a reference voltage, an output terminal of the operational amplifier outputs the error amplification signal, the eight resistor and the capacitor are connected in series between the output terminal of the operational amplifier and the ground.

18. The power converter according to claim 1, wherein the comparator circuit is a PWM comparator circuit.

19. A method for regulating line transient response for a power converter, wherein the power converter comprises an input, an output, and an energy storage circuit and a power switching circuit coupled between the input and the output, the method comprising:
generating a feedback voltage based on an output voltage from the output;
generating an error amplification signal based on the feedback voltage;
generating a control signal for controlling on/off of the power switching circuit based on a first comparison signal related to the error amplification signal and a second comparison signal related to a charging current of the energy storage circuit; and
coupling a voltage compensation signal that is constantly proportional to a magnitude of an input voltage received by the input to the error amplification signal, so as to reduce a variation amount of the error amplification signal when the input voltage varies.

20. A circuit, comprising:
an inductor coupled between an input node and an intermediate node;
a first switch coupled between the intermediate node and a reference node;
a second switch coupled between the intermediate node and an output node;
a first voltage sensor configured to sense voltage at the output node and generate a feedback voltage;
an amplifier configured to compare the feedback voltage to a reference voltage to generate a difference voltage;
a second voltage sensor configured to sense voltage at the input node and generate an adjustment voltage wherein the adjustment voltage is constantly proportional to a magnitude of the voltage at the input node;
a summation circuit configured to subtract the adjustment voltage from the difference voltage to generate a compensating voltage;
a current sensor configured to sense current in the inductor and generate a sense signal;

a comparator circuit configured to compare the sense signal to the compensating voltage to generate a pulse width modulated control signal; and a driver circuit operating in response to the pulse width modulated control signal to control on and off actuation of the first and second switches.

\* \* \* \* \*

UNITED STATES PATENT AND TRADEMARK OFFICE
CERTIFICATE OF CORRECTION

PATENT NO. : 9,811,101 B2  
APPLICATION NO. : 14/663165  
DATED : November 7, 2017  
INVENTOR(S) : Hai Bo Zhang et al.

Page 1 of 1

It is certified that error appears in the above-identified patent and that said Letters Patent is hereby corrected as shown below:

In the Specification

At Column 11, Line number 30, in the equation, please replace [[+/-]] with -- + --.

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*